US009156919B2

(12) United States Patent
Engelman et al.

(10) Patent No.: US 9,156,919 B2
(45) Date of Patent: Oct. 13, 2015

(54) METHOD OF REMOVING ALKYLENE HALOGENOHYDRIN FROM CELLULOSE ETHER

(75) Inventors: Richard A. Engelman, Midland, MI (US); David W. Ziettlow, Midland, MI (US); Robert E. Scheid, Jr., North Wales, PA (US); Charles B. Mallon, Hillsborough, NJ (US); Matthias Sprehe, Walsrode (DE); Andrew C. Arthur, Midland, MI (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 14/131,556

(22) PCT Filed: Jul. 17, 2012

(86) PCT No.: PCT/US2012/047007
§ 371 (c)(1),
(2), (4) Date: Jan. 8, 2014

(87) PCT Pub. No.: WO2013/016059
PCT Pub. Date: Jan. 31, 2013

(65) Prior Publication Data
US 2014/0148591 A1    May 29, 2014

Related U.S. Application Data

(60) Provisional application No. 61/512,115, filed on Jul. 27, 2011.

(51) Int. Cl.
C07H 1/00 (2006.01)
C08B 11/20 (2006.01)
C08B 11/02 (2006.01)
C08B 11/08 (2006.01)
C08B 11/193 (2006.01)
C08L 1/26 (2006.01)
C08L 1/28 (2006.01)

(52) U.S. Cl.
CPC .................. *C08B 11/20* (2013.01); *C08B 11/02* (2013.01); *C08B 11/08* (2013.01); *C08B 11/193* (2013.01); *C08L 1/26* (2013.01); *C08L 1/284* (2013.01)

(58) Field of Classification Search
CPC ........ C08B 11/20; C08B 11/02; C08B 11/08; C08L 1/26
See application file for complete search history.

(56) References Cited

U.S. PATENT DOCUMENTS

| 3,527,751 | A | 9/1970 | Gill |
| 4,431,800 | A | 2/1984 | Leusner et al. |
| 4,783,242 | A | 11/1988 | Robbins |
| 6,261,218 | B1 | 7/2001 | Schulz |
| 2001/0008048 | A1 | 7/2001 | Gehrmann et al. |
| 2004/0242862 | A1 | 12/2004 | Hammes |
| 2010/0063269 | A1 | 3/2010 | Mallon |
| 2001/0099862 | A1 | 4/2010 | Sprehe et al. |

FOREIGN PATENT DOCUMENTS

| EP | 0210917 | 12/1990 |
| EP | 1878752 | 1/2008 |
| WO | 00/63254 A1 | 10/2000 |

OTHER PUBLICATIONS

Corn Refiners Association Inc. Food Safety Information Papers—Chemical Residues. 217/765-4437. Nov. 16, 2000.
United States Environmental Protection Agency. Prevention, Pesticides and Toxic Substances. EPA 738-R-06-029. Reregistration Eligibility Decision for Propylene Oxide.
ITP Chemicals Chapter 3. The Propylene Chain.
Z. Anal. Chem. 1977, 161-190, Bartelmus & Ketterer: Analysis of Cellulose Ether Groups.
Methoden Der Org. Chem. 4th Edition, 1987, Band E20, Makromolekulare Stoffe. p. 2042-2047.
74th JECFA, 2011. Hydroxypropylmethyl Cellulose.

*Primary Examiner* — Elli Peselev

(57) ABSTRACT

In a method of removing alkylene halogenohydrin from a cellulose ether the cellulose ether is provided, water is added to the cellulose ether and subsequently alkylene halogenohydrin and water is removed from the cellulose ether by evaporation. Alternatively steam or a steam mixture can be sparged across or through the cellulose ether to remove halogenohydrin from the cellulose ether.

16 Claims, No Drawings

METHOD OF REMOVING ALKYLENE HALOGENOHYDRIN FROM CELLULOSE ETHER

CROSS REFERENCE TO RELATED APPLICATIONS

This application is a 35 USC §371 national phase filing of PCT/US2012/047007 filed Jul. 17, 2012, which claims the benefit of U.S. Application No. 61/512,115, filed Jul. 27, 2011.

FIELD

The present invention relates to a method of removing alkylene halogenohydrin from cellulose ether. The invention further relates to a method of making a low molecular weight hydroxyalkyl alkylcellulose with a reduced concentration of such alkylene halogenohydrin.

INTRODUCTION

Low molecular weight cellulose ethers are widely used in pharmaceutical applications or food, for example as a film-coating material on tablets, in pharmaceutical capsules or in light-coloured food compositions. Preferred cellulose ethers for such applications are methylcellulose and hydroxypropylmethylcellulose.

For a very wide range of fields of use, cellulose ethers having different degrees of substitution are prepared. The alkyl substitution is generally described by the DS in cellulose ether chemistry. The DS is the average number of substituted OH groups per anhydroglucose unit. The methyl substitution is stated, for example, as DS (M). Usually, the hydroxyalkyl substitution is described by the MS. The MS is the average number of moles of the etherifying reagent which form ether-like bonds per mole of anhydroglucose unit. The etherification with the etherifying reagent ethylene oxide is stated, for example, as MS (HE), and the etherification with the etherifying reagent propylene oxide is stated as MS (HP). The determination of the side groups is effected by the Zeisel method (literature: G. Bartelmus and R. Ketterer, Z. Anal. Chem. 286 (1977) 161-190).

Various properties of the products are established via the degree of etherification and the type of substituents, such as, for example, the thermal flocculation point, the solubility, the viscosity, the film formation capacity, the water retentivity and the adhesive power.

An overview of the chemical fundamentals and principles of preparation (preparation processes and process steps) and a list of substances and description of the properties and potential uses of the various derivatives appears, for example, in Houben-Weyl, Methoden der Organischen Chemie, Makromolekulare Stoffe [Methods of Organic Chemistry, Macromolecular Substances], 4th edition, volume E 20, page 2042 (1987).

A large variety of processes for producing low molecular weight cellulose ethers exist which can be divided into two production steps: 1.) cellulose ether feedstock production, and 2.) depolymerization to produce low molecular weight cellulose ether. In the first step cellulose ethers are produced by alkalizing a cellulose pulp and etherifying the produced alkali cellulose to form high molecular weight cellulose ether. In the following second step the depolymerization of the cellulose ether is typically achieved by acid catalyzed degradation to form low molecular weight cellulose ethers.

Especially propylene chlorohydrin (PCH) formation is a problematic minor by-product during production of, for example, hydroxypropyl methylcellulose (HPMC). Most notably it can be formed during the process to reduce the viscosity of HPMC through the application of hydrogen chloride (HCl) by the reaction of HCl with propylene oxide, with cleaved hydroxypropyl side groups or with propylene glycol. Another source is the formation of PCH during the process of manufacturing HPMC in the substitution reactor when propylene oxide and salt react with each other as a secondary reaction beside the intended reaction of propylene oxide and methyl chloride (MeCl) with alkali cellulose to form the methoxy and hydroxypropyl substitutions on the cellulose.

PCH-containing HPMC becomes a problem when that HPMC is intended for food or pharmaceutical applications for which regulations limit the amount of PCH which may be present. For example, European Economic Community food regulations for E464 (HPMC) currently require that PCH levels be present at not more than 0.1 ppm.

In the "Food Safety Information Papers: Chemical Residues" from the Corn Refiner Association, inc. prepared by White Technical Research Group 217/795-4437, 11/16/00 it is mentioned that hydroxypropyl starches are produced through reaction of starch with propylene oxide and that hydroxypropylated starches are often additionally cross-linked with phosphorous oxychloride to make hydroxypropylated and cross-linked starches with improved functionality. It is mentioned that propylene chlorohydrin is a regulated by-product of the reaction of phosphorous oxychloride with residual propylene oxide under alkaline conditions. In the paper it is further mentioned that propylene chlorohydrin, manganese, acetic acid and phosphate are chemical residues from starch modification reactions and that they can be reduced to approved levels by washing and drying. The paper states the limit for propylene chlorohydrin in modified food starch to be ≤5 ppm.

The European Patent EP 0 210 917 B1 relates to a method for the preparation of a cellulose ether having a decreased average degree of polymerization from a starting cellulose ether having a higher degree of polymerization. The patent discloses that in the method for the preparation a starting cellulose ether is contacted in a powdery form with an aqueous solution of hydrogen chloride in such an amount that the amount of water is in the range of 3-8% by weight based on the overall amount on the starting cellulose ether and the aqueous solution of hydrogen chloride and that the hydrogen chloride is removed from the mixture. The document teaches that when the amount of water is too small, the reaction velocity is somewhat increased accordingly but the resultant product is sometimes coloured yellow. On the other hand, when the amount of water is too large, agglomerates of the cellulose ether particles may be formed in addition to the decrease in the reaction velocity.

The U.S. Pat. No. 4,431,800 discloses a process for making propylene chlorohydrin free, hydroxypropylated starch wherein the excess propylene oxide is removed from the reaction mixture before neutralization of the starch. This removal of the propylene oxide prevents the formation of propylene chlorohydrin and thus alleviates the need for its removal. In the introducing part of the patent specification it is stated that while the chlorohydrin presence can be reduced to an acceptable level by extensive washing, this washing produces significant starch losses.

The U.S. Pat. No. 4,783,242 discloses a distillation system and process for removing vaporizable components from an aqueous medium including a distillation column for receiving an aqueous medium containing vaporizable components and passing steam through the column such that the steam directly contacts the aqueous medium to vaporize at least a portion of the components. According to the patent "vaporizable components" may include, for e.g., trichloroethane, propylene chlorohydrin, bromine, methylene chloride, benzene, toluene and mixtures thereof.

In order to meet the tight requirements with respect to PCH levels allowed to be present in food or pharmaceutical products, e.g. at not more than 0.1 ppm according to EEC food regulations for E464 (HPMC), improved methods are required to control and/or reduce PCH levels in those cellulose ethers, e.g. HPMC, used for the manufacturing of these products.

SUMMARY OF THE INVENTION

The inventors have now found that alkylene halogenohydrin can be efficiently removed from cellulose ether if extra water is added to the cellulose ether prior to drying or if steam or a steam mixture is used instead of air, nitrogen or vacuum as the drying medium.

In a first aspect of the invention, there is provided a method of removing alkylene halogenohydrin from a cellulose ether. The method comprises providing the cellulose ether, characterized in that water is added to the cellulose ether and subsequently alkylene halogenohydrin and water is removed from the cellulose ether by evaporation.

In a second aspect of the invention, there is provided a method of removing alkylene halogenohydrin from a cellulose ether, the method comprises providing the cellulose ether, characterized in that steam or a steam mixture is sparged across or through the cellulose ether.

In a third aspect of the invention, there is provided a method of making a hydroxyalkyl alkylcellulose with a reduced concentration of alkylene halogenohydrin comprising the steps of: a) providing a hydroxyalkyl alkylcellulose; and b) contacting the hydroxyalkyl alkylcellulose with an acid to partially depolymerize the hydroxyalkyl alkylcellulose to a hydroxyalkyl alkylcellulose having a lower molecular weight and a lower viscosity; characterized in that after the depolymerization step b) the method comprises the following steps: c) adding water to the reaction mixture of the hydroxyalkyl alkylcellulose having the lower molecular weight and the lower viscosity, and d) removing alkylene halogenohydrin and water from the reaction mixture by evaporating.

In a fourth aspect of the invention, there is provided a method of making a hydroxyalkyl alkylcellulose with a reduced concentration of alkylene halogenohydrin comprising the steps of: a) providing a hydroxyalkyl alkylcellulose; b) contacting the hydroxyalkyl alkylcellulose with an acid to partially depolymerize the hydroxyalkyl alkylcellulose to a hydroxyalkyl alkylcellulose having a lower molecular weight and a lower viscosity; characterized in that after the step b) the method comprises the following step: c) sparging steam or a steam mixture across or through the hydroxyalkyl alkylcellulose having the lower molecular weight and the lower viscosity.

It is surprising that, for example, PCH level in HPMC can be reduced significantly faster in a horizontal plough share mixer (such as DRUVATHERM® reactors or Ploughshare® mixers of Gebr. Loedige Maschinenbau GmbH and Littleford Day Inc. or HTK of AVA-Huep GmbH & Co. KG) at 100° C. under vacuum when additional 10 weight percent water was added to the HPMC. Or, as another example, that that PCH can be removed significantly faster if sparged with 60 psi (150° C.) saturated steam than if sparged with 130° C. nitrogen.

DETAILED DESCRIPTION OF THE INVENTION

The present invention addresses the problem of removing alkylene halogenohydrin from cellulose ethers, especially propylene chlorohydrin (PCH) from hydroxypropyl-containing cellulose ethers, e.g. from hydroxypropyl methylcellulose (HPMC). In its broadest aspect, the invention is characterized in that water is added to the alkylene halogenohydrin containing cellulose ether and subsequently removing at least a part or all of the water by evaporation. Along with the water the alkylene halogenohydrin is also removed. As an alternative to adding water and removing the water by evaporation the alkylene halogenohydrin can be removed by sparging steam or a steam mixture across or through the cellulose ether. In this case the alkylene halogenohydrin is separated from the cellulose ether by the steam and is removed with the stream of the steam.

The term "steam" as used here refers to either the gas phase of water or to mist (defined as water condensed from the gas phase of the water) or to a mixture of mist and the gas phase of water (wet steam). "Steam" includes saturated steam which is steam at equilibrium with liquid water and includes superheated steam which is steam at a temperature higher than its boiling point at a given pressure. The term "steam mixture" as used here refers to any mixture comprising steam as defined above and a gas other than gaseous water. Examples of steam mixtures are mixtures of steam and hot air, mixtures of steam and nitrogen, and mixtures of steam and another inert gas.

In case of the first alternative, i.e. where water is added and removed by evaporation, it is an option that the cellulose ether is at least partially dried or at least partially mill-dried before the water is added to the cellulose ether.

In case of the second alternative, i.e. where steam or a steam mixture is sparged across or through the cellulose ether, it is an option that the cellulose ether is at least partially dried or at least partially mill-dried before and/or after the steam or the steam mixture is sparged across or through the cellulose ether.

Both of the above alternative methods according to the invention are particularly advantageous if the cellulose ether is not completely dissolved in aqueous medium. The cellulose ether may also be present as a solid, a water-moist cellulose ether, a paste or as a slurry or dispersion of solid cellulose ether in water, i.e. two phase mixture consisting of a liquid phase (primarily water) and a solid phase (primarily cellulose ether).

In a particularly preferred embodiment of the invention the cellulose ether comprises or consists of hydroxypropylated cellulose, for example hydroxypropyl methylcellulose or hydroxypropyl cellulose. Especially preferred and relevant from a commercial point of view is hydroxypropyl methylcellulose.

When hydroxypropylated cellulose is considered the alkylene halogenohydrin of interest comprises or consists of two isomers of propylene chlorohydrin (PCH), namely its isomers 1-chloro-2-propanol (1C2P) and 2-chloro-1-propanol (2C1P).

In order to accelerate and/or improve the removing of the alkylene halogenohydrin from the cellulose ether it is advisable to mix or agitate the cellulose ether while adding the water and/or while evaporating the alkylene halogenohydrin and the water or at least a part of the water. For the same reason it is also advisable to mix or agitate the cellulose ether while sparging the steam or the mixture comprising steam across or through the cellulose ether. The terms "Mixing" and/or "agitating" in this context also includes means like fluidizing, moving around and similar treatments.

The present invention addresses also the problem of making a low molecular weight hydroxyalkyl alkylcellulose with a reduced concentration of alkylene halogenohydrin, especially with a reduced concentration of propylene chlorohydrin (PCH) when making low molecular weight hydroxypropyl-containing cellulose ethers, e.g. hydroxypropyl methylcellulose (HPMC). In its broadest aspect, the invention is characterized in that the method of making the hydroxyalkyl alkylcellulose comprises the steps of:

a) providing a hydroxyalkyl alkylcellulose; and
b) contacting the hydroxyalkyl alkylcellulose with an acid to partially depolymerize the hydroxyalkyl alkylcellulose to a hydroxyalkyl alkylcellulose having a lower molecular weight and a lower viscosity;

characterized in that after the depolymerization step b) the method comprises the following steps:

c) adding water to the reaction mixture of the hydroxyalkyl alkylcellulose having the lower molecular weight and the lower viscosity, and
d) removing alkylene halogenohydrin and water from the reaction mixture by evaporating.

As an alternative to adding water and removing the water by evaporation the alkylene halogenohydrin can be removed in that steam or a steam mixture is sparged across or through the cellulose ether. In this case the alkylene halogenohydrin is removed with the stream of the steam. In its broadest aspect, this alternative method of the invention comprises the steps of:

a) providing a hydroxyalkyl alkylcellulose;
b) contacting the hydroxyalkyl alkylcellulose with an acid to partially depolymerize the hydroxyalkyl alkylcellulose to a hydroxyalkyl alkylcellulose having a lower molecular weight and a lower viscosity; and characterized in that after the step b) the method comprises the following step:

c) sparging steam or a steam mixture across or through the hydroxyalkyl alkylcellulose having the lower molecular weight and the lower viscosity.

In case of the first alternative, i.e. where water is added and removed by evaporation, it is an option that after step b) and prior to step c) the hydroxyalkyl alkylcellulose having the lower molecular weight and the lower viscosity is at least partially dried or at least partially mill-dried.

In case of the second alternative, i.e. where steam or a steam mixture is sparged across or through the hydroxyalkyl alkylcellulose, it is an option that after step b) and prior to step c) the hydroxyalkyl alkylcellulose having the lower molecular weight and the lower viscosity is at least partially dried or at least partially mill-dried and/or that after step c) the hydroxyalkyl alkylcellulose having the lower molecular weight and the lower viscosity is at least partially dried or at least partially mill-dried.

Both of the above alternative methods according to the invention are particularly advantageous if the cellulose ether is not completely dissolved in aqueous medium. In both of the alternative methods it is preferred when the hydroxyalkyl alkylcellulose is provided as a solid or is provided as a water-moist solid or is provided as an at least two phase mixture, wherein the mixture comprises or consists of a liquid phase and a solid phase, wherein the solid phase comprises or consists of the hydroxyalkyl alkylcellulose or when prior to step b) water is added to the hydroxyalkyl alkylcellulose. In other words: In both of the alternative methods it is advantageous that the hydroxyalkyl alkylcellulose is not present as a solution but in the solid form. The hydroxyalkyl alkylcellulose may also be present as a solid, a water-moist hydroxyalkyl alkylcellulose, a paste or as a slurry or dispersion of solid hydroxyalkyl alkylcellulose in water, i.e. a two phase mixture consisting of a liquid phase (water) and a solid phase (hydroxyalkyl alkylcellulose).

According to the invention adding the water in step c) can be performed in any suitable equipment in which mixing will occur, including but not limited to blenders, agitated reactors, fluidized bed, tumblers, pipes or ducts. Also in the alternative method of the invention the sparging of the steam or the steam mixture in step d) can be performed in any suitable equipment in which mixing will occur, including but not limited to blenders, agitated reactors, fluidized bed, tumblers, pipes or ducts.

According to the method of the invention the added water can be at a temperature in the range of from 10 to 100° C. However, it is preferred that the added water is hot, and more specifically, at a temperature higher than the dissolution temperature of the cellulose ether. In a particularly preferred embodiment of the invention the added water is at a temperature in the range of from 45 to 100° C. An advantage of hot water is that hydration of the hydroxyalkyl alkylcellulose, especially of HPMC, is prevented. Hot water and steam are at sufficiently high temperature to avoid dissolution of the cellulose ether. Preferably, in case of water the temperature is from 45° C. to boiling point, more preferably from 55° C. to boiling point, in case of steam the temperature is preferably up to 180° C., more preferably up to 150° C. However, it has been found that while the usage of hot water and steam are preferred, alkylene halogenohydrin can also be effectively removed from the cellulose ether when water of a lower temperature is used, e.g., of a temperature of 10° C. or more.

In each of the alternative methods of the invention the amount of added water via liquid water or condensed steam preferably yields in a water content of from 2 to 50 percent by weight, more preferably of from 8 to 50 percent by weight, based on the total amount of cellulose ether and water.

In case of the first alternative, i.e. where water is added and removed by evaporation, the added water may contain salt if low salt content is not required in the product.

Alternatively or in addition to the use of hot water or steam the hydroxyalkyl alkylcellulose can be heated prior to contacting the hydroxyalkyl alkylcellulose with the acid, preferably to a temperature above 45° C., more preferably to a temperature of from 50 to 100° C. In both alternative methods of the invention it is preferred that after step b), i.e. after contacting the hydroxyalkyl alkylcellulose with the acid, the depolymerization is stopped when a targeted viscosity of the hydroxyalkyl alkylcellulose is reached. The depolymerization can be stopped by partially or substantially neutralizing the acid with a basic compound. As an alternative the depolymerization can be stopped by applying a vacuum to remove the acid by evaporation. When evaporation is used to stop the depolymerization it has to be ensured that the acid, for example HCl, is substantially removed from the low molecular weight hydroxyalkyl alkylcellulose.

Before partial depolymerization the viscosity of the cellulose ether is typically more than 50 mPa·s, preferably from 500 to 200,000 mPa·s, more preferably from 500 to 100,000 mPa·s, most preferably from 1,000 to 80,000, determined in a 1.5% by weight aqueous solution at 20° C. in a Haake RS600 at a shear rate of 2.55 s$^{-1}$.

After partial depolymerization the viscosity of the cellulose ether is typically from 1.2 to 200 mPa·s, preferably from 2 to 100 mPa·s, more preferably from 2.5 to 50 mPa·s, measured as a 2 weight-% aqueous solution at 20° C. according to ASTM D2363-79 (Reapproved 2006).

In case of both alternative methods of the invention the depolymerization can be stopped after step b) and prior to step c) or can be stopped during step c). For example, in case of the second alternative method, i.e. where step c) comprises sparging steam, steam can be sparged into the vessel at the same time a vacuum is pulled to remove both the steam and the acid. The heat from the steam improves removal of a volatile acid. Alternatively, a basic compound can be added for neutralization, e.g., potassium bicarbonate can be added as a powder at the same time steam is being sparged through the vessel.

In a preferred embodiment of the invention there is no water, steam or moisture added to the hydroxyalkyl alkylcellulose or to the reaction mixture of the hydroxyalkyl alkylcellulose having the lower molecular weight and the lower viscosity after having provided the hydroxyalkyl alkylcellulose and until having stopped the depolymerization. The moisture addition (as either liquid water or steam) is accomplished after the viscosity degradation is complete. This is useful for maintaining high kinetic rates for viscosity degradation and minimizing off-colour particle (OCP) formation. In addition, very high water levels in the viscosity degradation reactor might have a negative impact on handling and flowability of the cellulose ether powder.

In a particularly preferred embodiment of the invention the hydroxyalkyl alkylcellulose comprises or consists of hydroxypropylated alkylcellulose, preferably hydroxypropyl methylcellulose. Hydroxypropyl methylcellulose is especially preferred. When hydroxypropylated cellulose or hydroxypropyl methylcellulose is considered the alkylene halogenohydrin of interest comprises or consists of propylene chlorohydrin (PCH) including its isomers 1-chloro-2-propanol (1C2P) and 2-chloro-1-propanol (2C1P).

In order to accelerate and/or improve the removal of the alkylene halogenohydrin from the hydroxyalkyl alkylcellulose having the lower molecular weight and the lower viscosity it is advisable to mix or agitate the hydroxyalkyl alkylcellulose having the lower molecular weight and the lower viscosity while adding the water and/or while evaporating the alkylene halogenohydrin and the water or at least a part of the water. For the same reason it is also advisable to mix or agitate the hydroxyalkyl alkylcellulose having the lower molecular weight and the lower viscosity while sparging the steam or the mixture comprising steam across or through the hydroxyalkyl alkylcellulose having the lower molecular weight and the lower viscosity.

Part of the invention is also a cellulose ether or hydroxyalkyl alkylcellulose having less than 1.0 ppm, preferably less than 0.5 ppm, and particularly preferred less than 0.1 ppm, alkylene halogenohydrin, wherein the cellulose ether or the hydroxyalkyl alkylcellulose, respectively, has been treated or made, respectively according to one of the above described methods.

Also part of the invention is a product comprising the cellulose ether or hydroxyalkyl alkylcellulose, respectively, as mentioned before.

The examples hereinafter are intended to explain the inventive use without restricting the invention:

EXAMPLES

Determination of Propylene Chlorohydrins

The method for determination of 1-chloro-2-propanol and 2-chloro-1-propanol is based on extraction of the analytes with diethyl ether and subsequent quantification by gas liquid chromatography with a Mass Selective Detector operating in Selection Ion Monitoring (SIM) mode with internal standard quantification. The propylene chlorohydrin content is reported either as each individual isomer or as the sum of the 2 isomers (mg/kg).

Equipment:
  Gas Chromatograph Agilent 6890 or 7890 interfaced with a mass selective detector Agilent 5973 or 5975 or equivalent
Chromatographic Column:
  DB624 (deactivated fused silica), 30 m, 1.4 μm film, 0.25 inner diameter available from J&W Scientific, P/N 122-1334, Agilent, USA
Chromatographic Conditions:
  Final injector temperature of 225° C., final oven temperature of 230° C., 1.4 mL/min constant Helium flow
Mass Spectrometric Conditions:
  Transfer line 260° C., MS Source 230° C., MS Quad 150° C.
Selective Ion Monitoring (SIM) Ions:
  o-Xylene-d10: Target ion=116 amu; Qualifier ion=98 amu
  1C2P: Target ion=79 amu; Qualifier ion=81 amu
  2C1P: Target ion=58 amu; Qualifier ion=31 amu
Internal Standard Solution:
  Through serial dilutions, 0.0000008 (8E-7) grams of o-xylene-d10 (CAS 56004-61-6) in 0.5 ml methanol and 245.5 ml diethyl ether
Standard Solutions:
  Serial dilutions of 1-chloro-2-propanol, 2-chloro-1-propanol with diethyl ether
Sample Preparation:
  Weigh about 1 g of sample into a glass vial. Quantitatively add 5.0 mL Internal Standard Solution to the sample and mix for 2 hours. Let the sample settle for 15 minutes before injection of a 5 μL aliquot.

Example 1 (Comparative)

A hydroxypropyl methylcellulose (HPMC) having a DS(methyl) of 1.93 and an MS(hydroxypropyl) of 0.28 and a viscosity of 5.9 mPa·s, measured as a 2 weight-% aqueous solution at 20° C. according to ASTM D2363-79 (Reapproved 2006), contained 0.132 ppm of 1-chloro-2-propanol (1C2P) and 0.082 ppm of 2-chloro-1-propanol (2C1P). The moisture content of this sample was less than 3 weight percent. A sample of the HPMC was placed in a Loedige M-5 (Gebr. Loedige Maschinenbau GmbH) 5-liter laboratory mixer. The mixer was a jacketed drum with a 190 mm diameter and 172 mm length, giving a nominal volume of 5 liters and an effective working volume of 3.5 liters. The agitation consisted of 2 full shovels and 2 half shovels which were operated at 188 rpm. The mixer also had a fixed speed chopper which operates at 3360 rpm. The jacket temperature was set at 100° C. Pressure on the vessel was connected to full vacuum (≥980 mbar differential pressure) and samples were removed periodically for analysis. The results are given in Table 1. Heating the sample under vacuum only slowly reduced the levels of the PCH even after 4 hours.

TABLE 1

Evaporation of PCH in Loedige under Vacuum

| Time (hours) | 1C2P (ppm) | 2C1P (ppm) |
|---|---|---|
| 0.5 | 0.126 | 0.080 |
| 1.0 | 0.120 | 0.077 |
| 2.0 | 0.199 | 0.076 |

TABLE 1-continued

Evaporation of PCH in Loedige under Vacuum

| Time (hours) | 1C2P (ppm) | 2C1P (ppm) |
|---|---|---|
| 3.0 | 0.114 | 0.077 |
| 4.0 | 0.107 | 0.073 |

Example 2 (Comparative)

Using the same HPMC lot and Loedige M-5 vessel, evaporation of PCH was attempted using heated nitrogen. The jacket was again set at 100° C. with the agitator set at 3. Nitrogen was heated to 130° C. and injected into the HPMC polymer at a rate of 80 standard liters per minute. Samples were removed periodically and analyzed for the PCH. The results are given in Table 2. Flowing nitrogen was more effective at removing PCH from the HPMC polymer than evaporation under vacuum.

TABLE 2

Evaporation of PCH in Loedige with Hot Nitrogen

| Time (hours) | 1C2P (ppm) | 2C1P (ppm) |
|---|---|---|
| 0.5 | 0.108 | 0.073 |
| 1.0 | 0.072 | 0.055 |
| 2.0 | 0.034 | 0.033 |

Example 3

Using the same HPMC lot and Loedige M-5 vessel, stripping of PCH was attempted using steam. The jacket was again set at 100° C. with the agitator set at 3. 4.14 bar steam was injected into HPMC polymer with the vessel pressure set at a vacuum of 135.5 mbar. Samples were removed periodically for testing. The results are given in Table 3. Steam is highly effective at removing the PCH as only 10 minutes were required to achieve the same levels with steam as was achieved with hot nitrogen after one hour.

TABLE 3

Stripping of PCH in Loedige with Steam

| Time (minutes) | 1C2P (ppm) | 2C1P (ppm) |
|---|---|---|
| 5 | 0.110 | 0.072 |
| 10 | 0.070 | 0.052 |

Example 4

Using the same HPMC lot and Loedige M-5 vessel, enhanced evaporation of PCH was attempted by adding moisture to the HPMC polymer. The agitator was set at 3. The polymer was contacted with water at 30° C. to set the humidity of the polymer to 10 wt. %. Then the jacket temperature set point was raised to 100° C. and the sample was dried under full vacuum. The temperature reached 80° C. after 30 minutes and 100° C. after 60 minutes. Samples were removed periodically and analyzed. Moisture was measured in addition to PCH levels. The results are given in Table 4. The added water initially improved the rate of PCH removal compared to vacuum alone (Example 1) and drying under hot nitrogen (Example 2), but the rate of PCH removal decreased markedly after one hour at which time the moisture level in the sample had reduced to less than 1 wt. %.

TABLE 4

Enhanced Evaporation of PCH in Loedige with Water

| Time (hour) | Moisture (wt. %) | 1C2P (ppm) | 2C1P (ppm) |
|---|---|---|---|
| 0.5 | 7.05 | 0.084 | 0.062 |
| 1.0 | 0.95 | 0.064 | 0.053 |
| 2.0 | 0.50 | 0.050 | 0.043 |
| 3.0 | 0.25 | 0.037 | 0.035 |

What is claimed is:

1. A method of making a hydroxyalkyl alkylcellulose with a reduced concentration of alkylene halogenohydrin comprising the steps of:
   a) providing a hydroxyalkyl alkylcellulose; and
   b) contacting the hydroxyalkyl alkylcellulose with an acid to partially depolymerize the hydroxyalkyl alkylcellulose to a hydroxyalkyl alkylcellulose having a lower molecular weight and a lower viscosity;
characterized in that after the depolymerization step b) the method comprises the following steps:
   c) adding water to the reaction mixture of the hydroxyalkyl alkylcellulose having the lower molecular weight and the lower viscosity, and
   d) removing alkylene halogenohydrin and water from the reaction mixture by evaporating.

2. A method of making a hydroxyalkyl alkylcellulose with a reduced concentration of alkylene halogenohydrin comprising the steps of:
   a) providing a hydroxyalkyl alkylcellulose; and
   b) contacting the hydroxyalkyl alkylcellulose with an acid to partially depolymerize the hydroxyalkyl alkylcellulose to a hydroxyalkyl alkylcellulose having a lower molecular weight and a lower viscosity;
characterized in that after the step b) the method comprises the following step:
   c) sparging steam or a steam mixture across or through the hydroxyalkyl alkylcellulose having the lower molecular weight and the lower viscosity.

3. The method according to claim 1, wherein the hydroxyalkyl alkylcellulose is provided as a solid or is provided as a water-moist solid or is provided as an at least two phase mixture, the mixture comprising or consisting of a liquid phase and a solid phase, the solid phase comprising or consisting of the hydroxyalkyl alkylcellulose or wherein prior to step b) water is added to the hydroxyalkyl alkylcellulose.

4. The method according to claim 1, wherein the added water is at a temperature higher than the dissolution temperature of the cellulose ether.

5. The method according to claim 1, wherein the amount of added water via liquid water or condensed steam yields in a water content of from 2 to 50 percent by weight, based on the total amount of cellulose ether and water.

6. The method according to claim 1, wherein after contacting the hydroxyalkyl alkylcellulose with the acid and when a targeted viscosity of the hydroxyalkyl alkylcellulose is reached the depolymerization is stopped.

7. The method according to claim 6, wherein after providing the hydroxyalkyl alkylcellulose and until having stopped the depolymerization no water, steam or moisture is added to the hydroxyalkyl alkylcellulose or the reaction mixture of the hydroxyalkyl alkylcellulose having the lower molecular weight and the lower viscosity.

8. The method according to claim 1, wherein after step b) and prior to step c) the hydroxyalkyl alkylcellulose having the lower molecular weight and the lower viscosity is at least partially dried or at least partially mill-dried.

9. The method according to claim 2, wherein the hydroxyalkyl alkylcellulose is provided as a solid or is provided as a water-moist solid or is provided as an at least two phase mixture, the mixture comprising or consisting of a liquid phase and a solid phase, the solid phase comprising or consisting of the hydroxyalkyl alkylcellulose or wherein prior to step b) water is added to the hydroxyalkyl alkylcellulose.

10. The method according to claim 2, wherein the amount of added water via liquid water or condensed steam yields in a water content of from 2 to 50 percent by weight, based on the total amount of cellulose ether and water.

11. The method according to claim 2, wherein after contacting the hydroxyalkyl alkylcellulose with the acid and when a targeted viscosity of the hydroxyalkyl alkylcellulose is reached the depolymerization is stopped.

12. The method according to claim 11, wherein after providing the hydroxyalkyl alkylcellulose and until having stopped the depolymerization no water, steam or moisture is added to the hydroxyalkyl alkylcellulose or the reaction mixture of the hydroxyalkyl alkylcellulose having the lower molecular weight and the lower viscosity.

13. The method according to claim 2, wherein after step b) and prior to step c) the hydroxyalkyl alkylcellulose having the lower molecular weight and the lower viscosity is at least partially dried or at least partially mill-dried.

14. The method according to claim 1, wherein the hydroxyalkyl alkylcellulose is provided by alkalizing a cellulose pulp and etherifying the produced alkali cellulose with the etherifying reagents i) methyl chloride and ii) ethylene oxide or propylene oxide.

15. The method according to claim 2, wherein the hydroxyalkyl alkylcellulose is provided by alkalizing a cellulose pulp and etherifying the produced alkali cellulose with the etherifying reagents i) methyl chloride and ii) ethylene oxide or propylene oxide.

16. The method according to claim 15 wherein the method comprises step c) sparging steam or a steam mixture selected from the group consisting of a mixture of steam and hot air, a mixture of steam and nitrogen, and a mixture of steam and another inert gas across or through the hydroxyalkyl alkylcellulose having the lower molecular weight and the lower viscosity.

* * * * *